Aug. 7, 1956 — F. A. KROHM — 2,757,403
WINDSHIELD WIPER BLADE ASSEMBLY
Filed April 17, 1952 — 2 Sheets-Sheet 2

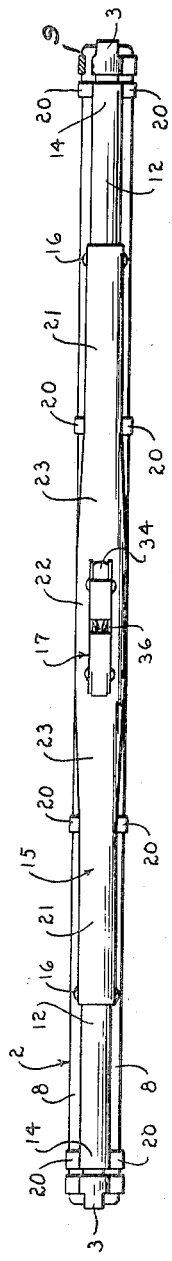

INVENTOR.
FRED A. KROHM
BY Charles S. Penfold
ATTORNEY

United States Patent Office 2,757,403
Patented Aug. 7, 1956

2,757,403

WINDSHIELD WIPER BLADE ASSEMBLY

Fred A. Krohm, Hobart, Ind., assignor to Productive Inventions, Inc., a corporation of Indiana Application April 17, 1952, Serial No. 282,846

3 Claims. (Cl. 15—245)

This invention relates generally to windshield wiper apparatus and more particularly is directed to a wiper blade assembly or unit.

At least one form of wiper blade assembly now in use for wiping flat and/or curved surfaces of windshields comprises a blade and a pressure distributing device operatively connected to the blade. More specifically in this regard, the blade is preferably comprised of a resilient wiping element and a flexible support therefor, and the pressure distributing device preferably includes a pair of secondary yokes having their ends connected to the blade and a primary yoke or bridge means having its extremities connected to intermediate portions of the secondary. The primary yoke or bridge is provided with a connector detachably connectable with a fitting carried by a wiper arm.

In wiper blade assemblies of the above or similar character, the operative relationship of the secondary yokes with the blade and the primary yokes is such, that in some instances, depending on weather conditions, snow will collect and pack between these parts to such an extent that the parts cannot move relative to one another. As a consequence, the blade assembly will not function properly, particularly while wiping or cleaning a curved surface. This problem has confronted engineers for many years.

One objective of the present invention is to embody improved principles of design and construction in a blade assembly of the type above referred to for the purpose of deflecting and ejecting snow and other foreign matter from the assembly so that the components of the assembly will operate or function as originally intended.

More particularly, an object of the invention is to provide the primary yoke or bridge with tapered channel or chute-like portions which are so disposed with respect to the secondary yokes and the blade that any snow or foreign matter which collects therebetween is pressed, squeezed or chuted outwardly in a direction toward the central part of the blade assembly so that it may readily fall away from the assembly while the assembly is moving back and forth across a windshield and the rubber wiper element is reversely tilting with each oscillation. Also, the various connections between the components of the assembly are preferably such that they offer sufficient controlled relative movement between the components to force and eject any snow outwardly from the tapered channelled portions of the primary yoke as well as assist in freeing any impacted snow from other portions of the assembly.

Another object of the invention is to provide a wiper blade assembly that is capable of wiping a flat surface, a concave surface, a convex surface, or combinations of these surfaces.

Another important object of the invention is to design and construct the central portion of the primary yoke in a manner whereby sufficient clearance or space is provided between such portion and the blade so that the snow ejected, due to the aforesaid tapered portions, and other snow may pass outwardly from such space.

An additional object of the invention is to construct the central portion of the primary yoke somewhat wider than the extremities of the yoke so that such portion will provide a baffle assisting to deflect snow, rain, and any foreign matter away from the space or area between the primary yoke and blade as the assembly is driven across a windshield.

Other attributes of the invention reside in its simplicity of design and construction, economy of manufacture, durability, and efficiency of operation.

Many other objects and advantages of the invention will present itself when the description herein set forth is considered in conjunction with the drawings annexed hereto.

In the drawings:

Figure 1 is a top view of the windshield wiper blade assembly embodying the invention;

Figure 2 is a side view of the blade assembly illustrated in Figure 1, with portions thereof shown in section for the purpose of exemplifying features of the invention;

Figure 3 is a side view, similar to Figure 2, showing the wiper blade assembly as applied to a curved windshield;

Figure 4:
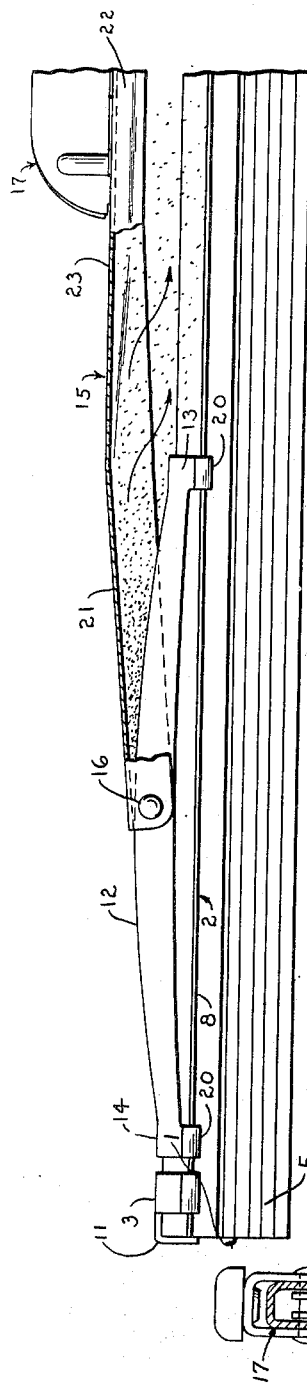
Figure 4 is an enlarged view of a portion of the assembly shown in Figure 2.

Referring to the drawings, the wiper blade assembly, among other things, includes a wiper blade and a pressure distributing device.

More particularly, the wiper blade comprises a resilient designated wiper member 1 and an elongated uniformly flexible support 2 detachably secured together by a pair of removable fasteners 3. The wiper member may be designed and constructed as desired, but is preferably formed to provide an attaching portion 4 and a wiping portion 5 joined together by a neck portion 6 to promote tilting of the wiping portion. The attaching portion 4 is preferably provided with oppositely disposed corresponding recesses or grooves 7 extending the full length of the attaching portion.

Figure 6:
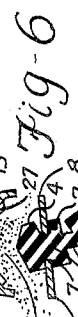
Figure 6 is a vertical section, taken through the central part of the wiper blade assembly for the purpose of exemplifying certain features of the invention; said figure also showing a part of a wiper arm connected with the connector on the primary yoke.

The support 2 may be designed and constructed as desired but is preferably comprised of a pair of corresponding flexors or flexible narrow strips 8, the inner marginal portions of which seat in the recesses 7 and the external portions of which project outwardly in the same general plane. When the blade assembly is operating as shown in Figure 6, the strips may slightly move relative to one another. The longitudinal marginal edges of the strips adjacent the ends are preferably provided with notches 9, as shown at the right of Figure 1. The fasteners 3 interlock with the notches and when interlocked, a portion of the wiper member, such as 10, shown in Figure 6, located between the strips serves to retain the fasteners in place. The fasteners can be easily removed by merely pressing the sides of the strips 8 toward one another to compress the portion 10 a sufficient extent to permit release of the fasteners from the notches, whereupon the fasteners can be slipped off the support. Each fastener is preferably provided with an offset abutment 11 for engaging an end of the wiper member to prevent relative longitudinal movement between the member and the support. The abutments 11 also serve as means which can be utilized in detaching the fasteners from the support.

Attention is directed to the fact that the fasteners not only serve to hold the support and wiper member detachably connected but also provide stops which hold the pressure device assembled with the blade and limit its longitudinal movement with respect thereto, which will be described subsequently.

The pressure distributing device may be constructed in various ways, but as herein illustrated, preferably includes a pair of secondary yokes 12, each having an inner end 13 and an outer end 14 slidably connected to the support only at longitudinally spaced points; a primary yoke or bridge means 15 having its ends connected to intermediate portions of the secondary yokes by pivots 16; and a connector 17 carried by the primary yoke for attachment with an entering part mounted on a wiper arm channel part. The fasteners 3 at the ends of the blade, as indicated above, provide stops and these limit the extent of the longitudinal movement of the pressure device relative to the blade.

The secondary yokes are preferably of channel construction and slightly curved so as to provide sufficient clearance for free inward movement of those portions of the blade between the respective ends of the yokes and at the same time allow those portions of the attaching portion 4 of the wiper member between such ends to more or less recede or nest in the yokes as exemplified in Figure 3 when the blade assembly is in one of its operating positions. The ends 13 and 14 of each of the yokes may be connected to the blade in any desirable manner but as herein shown each end is provided with offset ears or U-shaped portions 20 which slidably receive the external longitudinal portions of the strips. This type of connection controls the range of lateral pivotal or tilting movement of the blade relative to the secondary yokes and the pivotal connections between the ends of the primary yoke and the secondary yokes control the range of lateral pivotal or tilting movement of the secondary yokes with respect to the primary yoke. In other words, the various connections between the primary yoke and secondary yokes and between the latter and the blade provide freedom of action which is controlled, within practicable limits, so that the wiper member will produce a thorough job of cleaning either a flat and/or curved surface. It should be noted that the shape of the wiper member also contributes to an efficient wiping action by predetermining the range of movement of the wiping portion 5 with respect to the attaching portion 4.

The primary yoke 15 is of channel form and embodies improved principles of design and construction as mentioned above. It is preferably comprised of a plurality of portions having different cross-sectional configurations. More specifically, it includes a pair of corresponding straight channel portions 21 of uniform cross-section, a straight central channel portion 22 of uniform cross-section, and a pair of intermediate straight channel portions 23 of variable or tapering cross-section, which join the central portion 22 with the portions 21. The channel portions 21 constituting extremities of the primary yoke are preferably of a cross-sectional width less than the other channel portions and receive inner portions of the secondary yokes. In one of the infinite operating positions of the blade assembly as shown in Figure 3, the inner half portions of the secondary yokes are substantially arranged in the channel extremities 21 of the primary yoke. The base wall of the central portion 22 is generally rectangular in shape and the intermediate portions 23 at either end of this central portion are contiguous and preferably lie flat and in the same plane. As pointed out above the central portion serves as a baffle or deflector to divert snow, sleet and foreign matter from the blade assembly as the assembly is oscillated across a windshield as shown in Figure 6. The channel extremities 21 are arranged at slight angles with respect to the inner portions of the secondary yokes and to the aforesaid plane. It is to be understood, that insofar as one respect of the subject invention is concerned, the channel extremities 21 or the inner portions of the secondary yokes 12 may be made straight or curved so long as there are sufficient clearances to permit such extremities and such portions to move relative to one another. Furthermore, the invention can be practiced even though the side walls of the inner portions of the secondary yokes and the side walls of the central portion of the primary yoke are omitted.

The base and side walls of the intermediate portions 23 taper and converge in a direction from the central portion 22 toward the channel extremities and the side walls of the central portion are relatively short so that the central portion is somewhat shallower in depth than the other portions. The intermediate portions gradually merge with the central portion and channel extremities to provide a primary yoke of pleasing design which is in harmony with the design embodied in the other components of the blade assembly. As will be pointed out more in detail subsequently, the space between the central portion of the primary yoke and the blade is predetermined and the tapered intermediate portions 23 funnel any snow or sleet that collects between the secondary yokes and the primary into such space for escape from the assembly.

The connector 17 above referred to, which is supported on the primary yoke, is provided with a recess for receiving an entering part on a wiper arm and a latch 36 for detachably holding such a part in the recess. The latch is provided with a handle 34 for manipulating the latch.

The operation of the wiper blade assembly will now be described. When the blade assembly is wiping a flat windshield very little relative movement will take place between the secondary yokes and the primary yoke or the secondary yokes and the blade.

Figure 5:
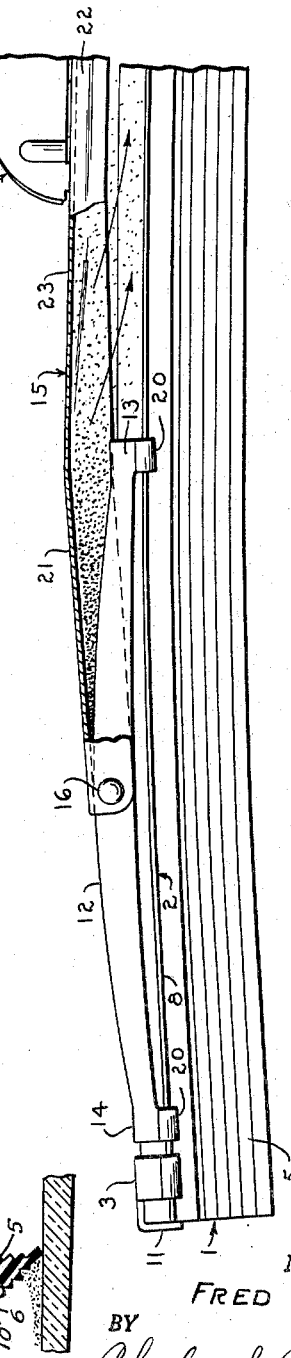
Figure 5 is an enlarged view of a portion of the assembly showing snow being ejected from the pressure-distributing device.

However, when the blade assembly is wiping a curved surface as shown in Figures 3 and 5, the secondary yokes will pivot on the ends of the primary yoke to cause the inner portions of the secondary yokes to move toward and away from the channel portions 21 of the primary yoke. This relative movement will compress any snow that collects between such portions and due to the acute angular relationship between such portions the snow will be squeezed or forced into the tapered intermediate portions 23 and then propelled in a direction toward the center of the blade assembly as indicated by the arrows in Figures 2, 4, 5 and 6, where it can fall outwardly and away from the assembly. Since the tapered portions 23 diverge from the channel portions 21 to the central portion 22 any snow that is pressed between the yokes will readily find escape from the blade assembly. The shallow character of the central channel portion not only permits snow to be discharged more readily but prevents accumulation of any snow within such portion. And, as pointed out above, the connector becomes an important feature of the invention, in that it provides, for substantially the full length and slightly beyond its ends, enough added strength for the central channel portion of the primary yoke to permit reducing the width of the side walls of the channel in order to form a shallower channel at the location or locations where snow is discharged.

Furthermore, in light snows the central portion 22 constitutes a shield which "baffles" and diverts the snow toward either side of the blade so that only a minimum can get under the primary yoke.

In heavier snows that pile up at the end of the blade stroke and thus tend to get under the primary yoke, the flexing of the blade, as it changes its arc to conform to the infinitely varying contours of a curved windshield, squeezes toward the middle of the primary yoke whatever snow may enter between the primary yoke and the inner portions of the secondary yokes. The facility with which the snow is extruded toward the central portion 22 or space between such portion and the blade is increased by the tapered potions 23; in other words, the tapers relieve resistance to the discharge or extrusion of the snow toward the central portion. As the snow reaches the central portion, it is worked out by the flexing of the wiping element and by lateral displacement as the blade assembly changes its direction at the end of the stroke. The limited side play at the pivotal connections between the ends of the primary yoke and secondary yokes—added to the limited side play permitted by the sliding connections between the secondary yokes and the support—causes the lower edge of the primary yoke, adjacent its central portion, to move farther away from the support on that side of the blade assembly toward which the blade is moving as shown in Figure 6—on either stroke—while at the same time the other edge of the primary yoke moves closer to the support. Relative movement between the flexors, their undulating movement and the rocking or tilting of the primary yoke or bridge member all contribute to ejecting and freeing the blade assembly and pressure device from snow.

Having thus described my invention it will be obvious that various modifications may be made in the same without departing from the spirit of the invention, hence I do not wish to be limited in its scope other than defined in the claims appended hereto.

I claim:

1. A wiper assembly for a windshield adapted for self-discharging of foreign material, such as snow, which may accumulate therein during the operation of the assembly, including: a bridge member of inverted U-shaped cross-section having an enlarged medial section of increased width and decreased depth to define a discharge area to permit lateral discharge of such material therefrom, a yoke freely pivoted intermediate its ends to the bridge member adjacent each end thereof, an inner portion of each yoke forming with the bridge member a passage leading to the discharge area and being movable in and out of the bridge member simultaneously with the pivoting of the yoke, and a flexible wiping blade carried by the yokes so that traversing the wiper assembly across a windshield pivots the yokes to move the inner portions with respect to the U-shaped bridge member and thereby compress and extrude any accumulated material between the bridge member and yokes through said passages into the discharge area.

2. A wiper assembly for a windshield adapted for self-discharging of foreign material, such as snow, which may accumulate therein including, a channel-shaped pressure distributing member having an enlarged medial portion serving to permit the discharge of such material from the assembly, said member also having adjacent tapered portions, an elongated support pivoted intermediate its ends to the member adjacent each end thereof, an inner portion of each support forming with the member a passage leading to the medial portion of the member and being movable into and out of the member at locations adjacent said medial portion, and a flexible blade carried by the supports, the arrangement being such that when the wiper assembly is directed across a windshield the supports will pivot and repeatedly cause their inner portions to move into and out of the member and force any such material accumulated between the supports and member through said passages into the tapered portions and generally toward said medial portion for discharge.

3. A wiper assembly adapted for self-discharging of foreign material, such as snow, which may accumulate therein including an elongated channel-shaped pressure distributing bridge adapted for attachment to a wiper arm, a flexible wiper blade, a yoke having its ends connected to the blade, said bridge having one end pivotally attached to an intermediate portion of the yoke and its opposite end operatively connected to the blade, said bridge having an enlarged medial section of increased width and decreased depth to define a central discharge area and also having a tapered portion opposite the flexible blade and intermediate the medial section and the pivotal connection between the bridge and yoke to provide a funnel-shaped passage through which any such material accumulating between the yoke and bridge and between the blade and tapered portion may be squeezed into the central area for discharge when the inner portion of the yoke is moved toward the bridge.

References Cited in the file of this patent

UNITED STATES PATENTS

| | | |
|---|---|---|
| 2,432,693 | Anderson | Dec. 16, 1947 |
| 2,543,383 | Scinta et al. | Feb. 27, 1951 |
| 2,548,090 | Anderson | Apr. 10, 1951 |
| 2,596,063 | Anderson | May 6, 1952 |
| 2,601,664 | Nesson | June 24, 1952 |
| 2,659,097 | Morton | Nov. 17, 1953 |